Patented July 16, 1929.

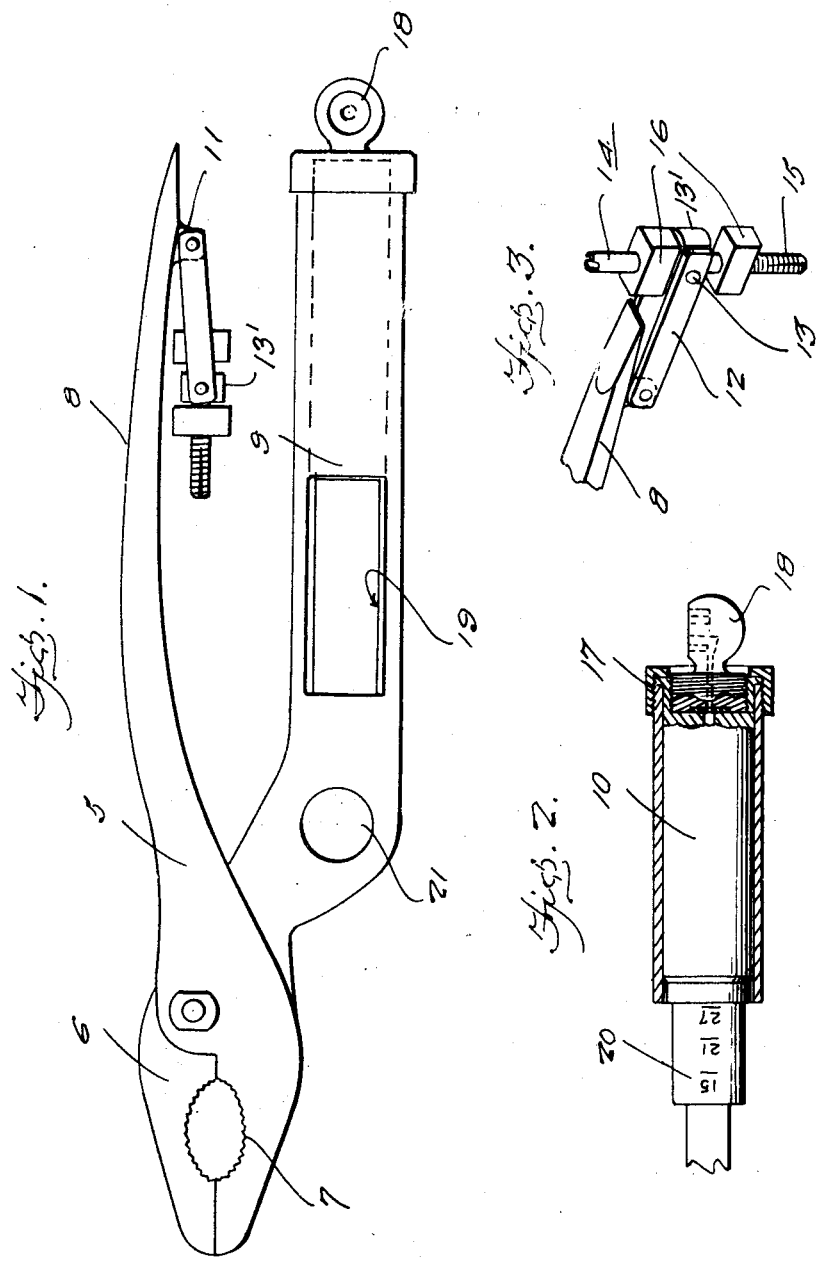

1,720,720

UNITED STATES PATENT OFFICE.

HARRY H. A. CORDES, OF FAYETTEVILLE, TEXAS.

COMBINATION TOOL.

Application filed August 1, 1927. Serial No. 209,778.

This invention relates to tools adapted particularly for use in connection with pneumatic vehicle tires, and has for its principal object to combine in a single unit a tool embodying a valve-stem nut and dust-cap gripping element in the form of a pair of pliers and having one of the handle members thereof constituting a holder for a tire gage with the other handle thereof arranged to carry a reamer for cleaning or rethreading the inside of the valve stem.

Another object is to provide a tool of this character of simple and practical construction, combining practically all of the necessary devices used in connection with the inflation of a pneumatic vehicle tire, each of which devices is adapted to be moved into an out-of-the-way position during the use of the other devices connected therewith, which is relatively inexpensive to manufacture, and otherwise well adapted for the purposes for which the same is intended.

Other objects and advantages reside in the special construction and combination of the various elements constituting the invention, reference being had to the accompanying drawings forming a part hereof, wherein:—

Fig. 1 is a plan view of the tool showing the various parts associated therewith, Fig. 2 is a longitudinal sectional view through the tubular handle constituting a holder for a tire gage, and Fig. 3 is a perspective view of the valve-stem reamer.

Referring now to the drawing in detail, my invention proposes the use of a pair of pliers indicated at 5 having jaws 6 formed at one end thereof with gripping faces 7 adapted to engage the dust-cap of a tire valve or the valve-stem and tire-rim retaining nuts for the purpose of removing the same when desired, and having handles formed at the opposite end thereof, one handle indicated at 8 having its end formed into a screw-driver, with the other handle 9 of a tubular construction within which to receive a tire gage 10.

The handle member 8 carries a lug 11 along its inner edge to which is pivotally mounted a pair of arms 12 at opposite sides thereof, said arms being arranged in spaced parallel relation with their free ends having openings for pivotally supporting pins 13 extending outwardly from opposite sides of a spacing block 13′, disposed between the arms and having a central opening through which is rotatably inserted the shank 14 of a reamer 15, said reamer and shank being adapted to be moved into a position at right angles with respect to the arm as shown in Fig. 3 when desired for use or may be moved into a longitudinally extended position as illustrated in Fig. 1 when the same is not in use. Knobs 16 are formed on the shank and reamer at opposite sides of the arms 12 providing gripping means for the reamer in order to suitably rotate the same during the reaming of the threads of the valve stem.

The tubular handle member 9 is adapted to permit the insertion of the tire gage 10 through the end thereof, the base of the gage being retained at the end of the handle by a threaded collar 17 permitting the valve-stem engaging head 18 of the gage to protrude outwardly of the handle a sufficient distance to permit the ready engagement with the valve stem for the proper operation thereof. Slots 19 are formed in the handle adjacent the inner edge of the gage 10 whereby to enable the operator to observe the pressure-indicating plunger 20 of the gage when the same is operatively connected with the valve stem.

An opening 21 is formed near the inner end of the handle member 9 thus permitting the tool to be hung from a nail or hook in a convenient position for the operator.

From an inspection of Fig. 2 of the drawing it is apparent that the tire gage 10 may be easily and quickly removed from the handle member 9 whenever desired for the purpose of repairing or replacing the same.

Attention is also directed to the fact that all parts of the gage except the valve-stem attaching head is protected within the tubular portion of the handle member thereby preventing injury to the same.

It is obvious that the invention is susceptible of various changes and modifications without departing from the spirit and scope of the appended claim, and I accordingly claim all such forms of the device to which I am entitled.

I claim:—

A reamer attachment for tool handles comprising a pair of spaced parallel arms pivotally attached at one end to the handle and adapted for movement into and out of extended position with respect thereto, and a valve stem reamer pivotally carried by the free end of said arms and mounted for rotary movement independent of its pivotal connection.

In testimony whereof I affix my signature.

HARRY H. A. CORDES.